Feb. 3, 1931.　　F. SCHROTTKE　　1,791,043
LEAD COVERED POWER CURRENT CABLE
Filed July 10, 1929
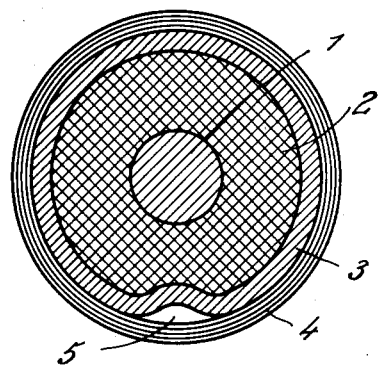
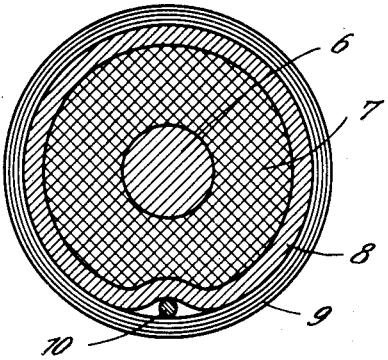
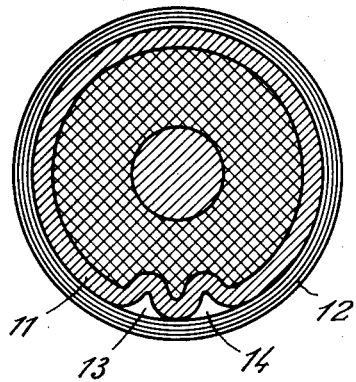
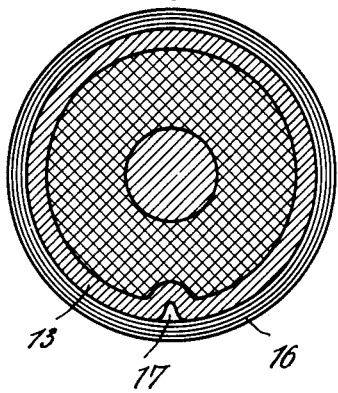
Inventor
Franz Schrottke
by Knight Bros
Attorneys Patented Feb. 3, 1931

1,791,043

UNITED STATES PATENT OFFICE

FRANZ SCHROTTKE, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

LEAD-COVERED POWER CURRENT CABLE

Application filed July 10, 1929, Serial No. 377,139, and in Germany July 10, 1928.

My invention relates to improvements in lead-covered power current cables.

In lead-covered power cables it has been observed that when the lead sheath expands due to the heating by the current traversing the conductor the lead sheath does not contract again to the same extent when cooling. In this way cavities are formed in the insulation which cause ionization phenomena and shorten the life of the cable.

To eliminate this drawback it has been attempted to provide lead-covered cables with a tightly enveloping or enclosing metal tape of considerable tensile strength. Experience has, however, shown that even very powerful tapes or bands are not able to return a lead sheath which has expanded under the action of heat completely to its original width because pressures would be necessary for this purpose with which the cable bushings and boxes are unable to cope.

According to my invention the lead sheath is provided with folds or tucks. These folds may run parallel to the axis of the cable or helically around it.

Various embodiments of my invention are illustrated in the drawing attached to my specification.

Figures 1 to 4 of the drawing show cross-sections through various constructions of my improved cable.

Referring to Fig. 1 of the drawing 1 is the conductor or core, 2 the paper insulation impregnated with cable impregnating compound, 3 the seamless lead sheath, and 4 the metal tape wrapped around the sheath. According to my invention the lead sheath is provided with a fold or tuck 5 produced while the lead is pressed around the cable or in a separate operation.

Referring to Fig. 2 of the drawing 6 is the conductor or core, 7 the paper insulation, 8 the sheath of lead and 9 the metal tape upon the lead sheath. Before applying the metal tape to the lead sheath a wire 10 is here placed between the two parts so that a dent is formed in the lead sheath. It will be understood that instead of a single wire a plurality of wires may be spaced around the circumference of the lead sheath. The depth and width of the fold or dent depends on the mode of production and the extent to which the lead sheath should expand and contract.

In Fig. 3 is 11 the lead sheath, 12 the metal tapes, 13 and 14 deep and comparatively wide folds in the lead sheath.

In Fig. 4 the lead sheath is enveloped by a tape 16 and provided with a narrow and less deep fold or dent 17.

It will be readily understood that although my invention is shown in conjunction with single conductor or core cables it is equally well applicable to cables with a plurality of conductors or cores.

I claim as my invention:

1. In a lead-covered power cable with seamless lead sheath, a metal tape enveloping said lead sheath, and cavities intermediate said lead sheath and said metal envelope formed by folds in said lead sheath, said folds being located in the direction of the cable axis.

2. In a lead-covered power cable with seamless lead sheath, a metal tape enveloping said lead sheath, and cavities intermediate said lead sheath and said metal envelope formed by folds in said lead sheath, said folds being located helically in the direction of the cable axis.

3. In a lead-covered power cable with seamless lead sheath, a metal tape enveloping said lead sheath, and cavities intermediate said lead sheath and said metal envelope formed by folds in said lead sheath, and a wire located in the crease formed by a fold.

In testimony whereof I affix my signature.

FRANZ SCHROTTKE.